United States Patent [19]

Schupbach et al.

[11] Patent Number: 4,764,053

[45] Date of Patent: Aug. 16, 1988

[54] METHOD OF INSTALLING A FLOATABLE PUMP APPARATUS AND AN ANTI-EROSION PLATE IN A WATER TREATMENT BASIN

[75] Inventors: Steven A. Schupbach, Rockford; James A. Knight, Pearl City, both of Ill.

[73] Assignee: Aqua-Aerobic Systems, Inc., Rockford, Ill.

[21] Appl. No.: 44,223

[22] Filed: Apr. 30, 1987

[51] Int. Cl.$^4$ .............................................. B63B 35/00
[52] U.S. Cl. .................................... 405/209; 405/195
[58] Field of Search .......................... 92/128; 114/283; 366/348, 349; 405/209, 195; 417/360

[56] References Cited

U.S. PATENT DOCUMENTS 4,422,771 12/1983 Earhart et al. ..................... 366/251
4,435,108 3/1984 Hampton ............................ 405/209

Primary Examiner—P. W. Echols
Assistant Examiner—Andrew E. Rawlins
Attorney, Agent, or Firm—Vernon J. Pillote

[57] ABSTRACT

A method of installing a floatable pump apparatus and an anti-erosion plate at a selected location in a bounded water treatment basin wherein the floatable pump apparatus includes a float having a central opening therethrough and a motor and axial flow propeller-type pump. A winch is temporarily mounted on the upper side of the float and one end of the winch cable is extended downwardly through the central opening in the float and attached to the anti-erosion plate. The float and winch with the anti-erosion plate suspended from the winch cable is then lifted by a shore based crane and deposited in the water treatment basin adjacent the boundary of the basin. The float with the anti-erosion plate buoyantly supported thereby, is moved to the desired location in the basin and the winch then operated to lower the anti-erosion plate onto the bottom of the basin. The float is thereafter moved back to the boundary of the basin. The winch is removed and the motor pump unit then assembled on the float, after which the floatable pump apparatus is floated back to a position over the anti-erosion plate and anchorerd in that location.

6 Claims, 2 Drawing Sheets

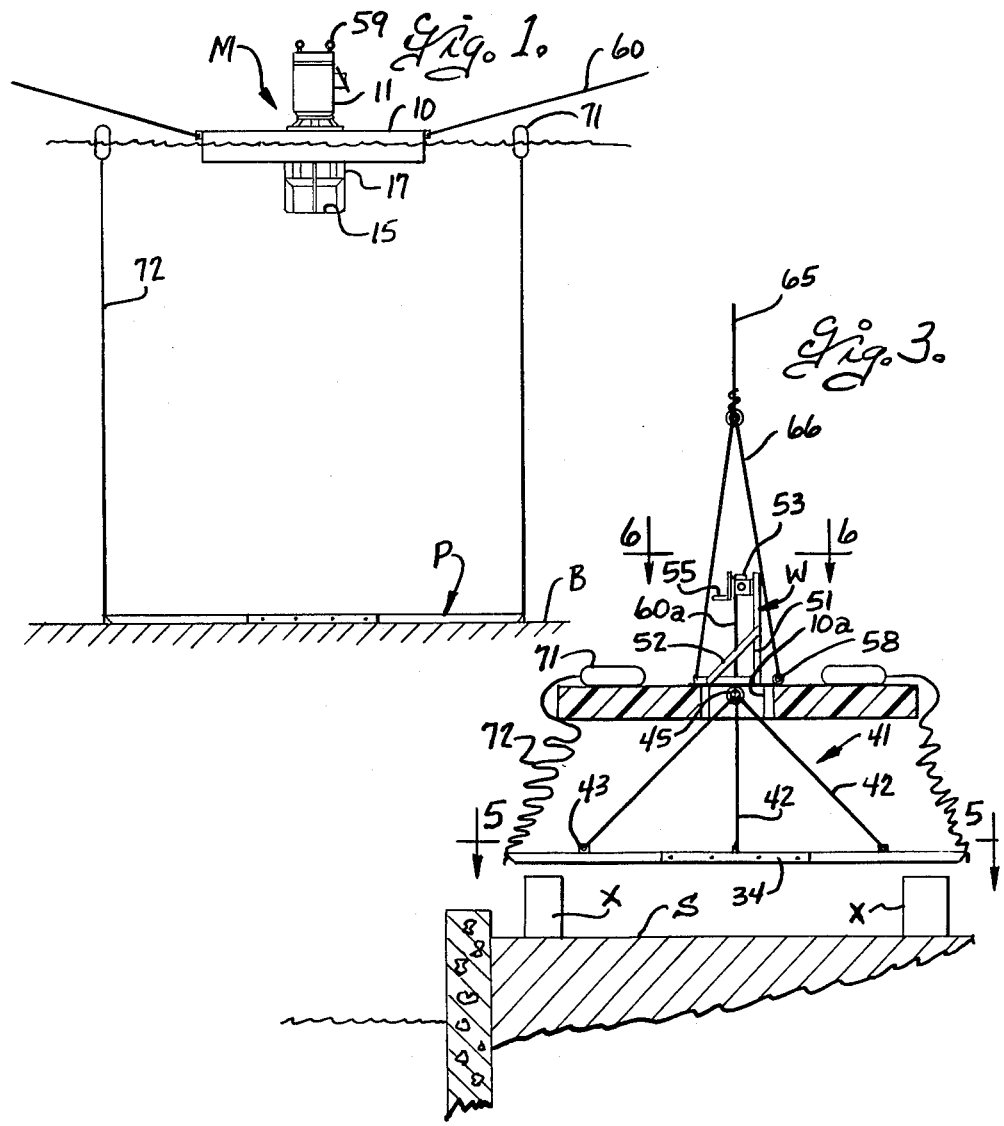
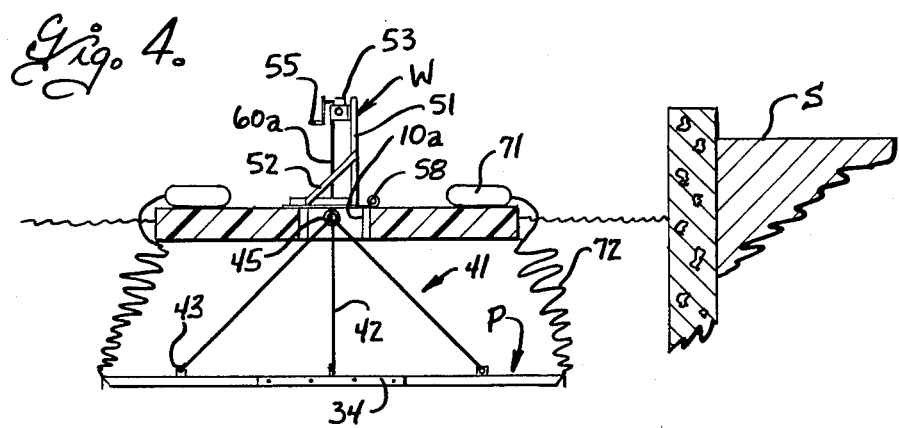

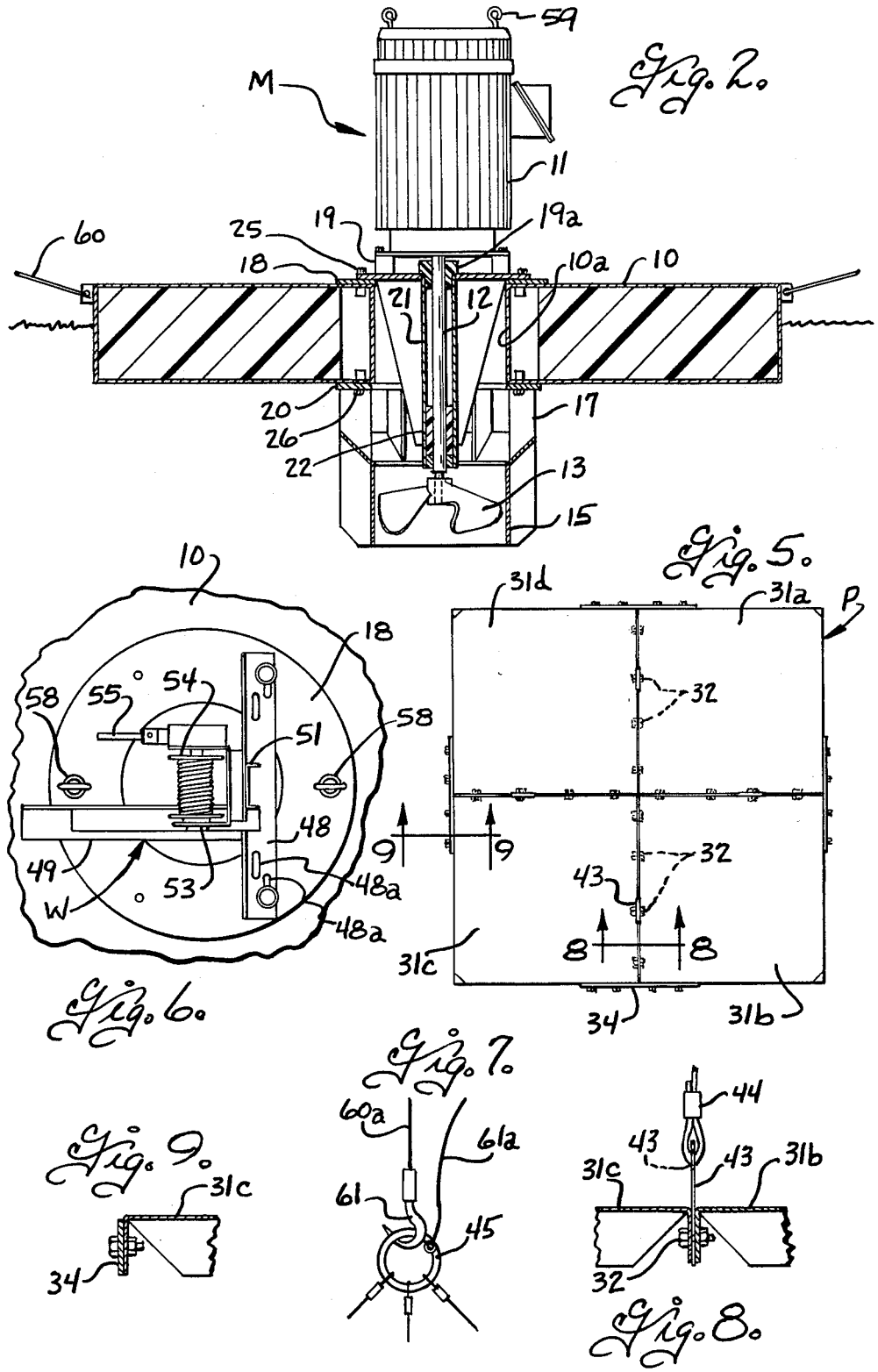

METHOD OF INSTALLING A FLOATABLE PUMP APPARATUS AND AN ANTI-EROSION PLATE IN A WATER TREATMENT BASIN

BACKGROUND OF THE INVENTION

Many water treatment basins have unlined or incompletely lined bottoms and are subject to serious bottom erosion when downflow mixers and even some aerators are installed in the basin. In order to reduce the erosion problem, it has been a common practice to provide a diffusion cone on the bottom of a downflow mixer such as disclosed in U.S. Pat. No. 4,422,771, to direct the liquid downwardly and outwardly in a generally conical stream. Such conical flow diffusers, however, impede mixing of the basin particularly in the area below the conical flow diffuser. It has also been proposed to provide an anti-erosion pad at the bottom of the basin below the mixer. To be effective in reducing erosion, the anti-erosion pad must cover a large area of the basin bottom below the mixer. Some anti-erosion pads have heretofore been formed of concrete that is poured in place on the bottom of the basin. However, such poured in place anti-erosion pads require that the basin be drained during installation of the pad and this is not always convenient or even possible in some basins. Moreover, mixers are frequently used in water treatment basins at locations too far from the boundary or shore of the basin to enable use of a shore based crane or the like to position a relatively large and heavy anti-erosion plate at the desired location on the bottom of the basin.

SUMMARY OF THE INVENTION

It is an object of the present invention to provide a method of installing a floatable pump apparatus and an anti-erosion plate at a selected location in a water treatment basin, and which utilizes the float for the floatable pump apparatus to buoyantly support the anti-erosion plate while it is being moved from a location adjacent the boundary of the basin to the selected location remote from the boundary of the basin.

Another object of this invention is to provide a method of installing a floatable pump apparatus and an anti-erosion plate in a water treatment basin in accordance with the foregoing object, and which minimizes the likelihood of tipping of the float during installation of the anti-erosion plate in the basin.

Accordingly, the present invention provides a method of installing a floatable pump apparatus and an anti-erosion plate means at a selected location in a bounded water treatment basin, the floatable pump apparatus including float means having a central opening therethrough, and motor-pump means having a drive motor and a propeller shaft drivingly connected to the drive motor and propeller means on the propeller shaft; the method comprising the steps of:
  (a) mounting a winch means on the upper side of the float means adjacent the central opening in the float means, and extending one end of a winch cable from the winch means downwardly through said central opening;
  (b) attaching said one end of the winch cable to the anti-erosion plate means;
  (c) lifting the float means and the winch means with the anti-erosion plate means suspended from the winch cable below the float means and setting the anti-erosion plate means and float means in the basin at a location remote from said selected location;
  (d) moving the float means with the anti-erosion plate buoyantly supported thereby to said selected location;
  (e) operating the winch means to lower the anti-erosion plate means onto the bottom of the basin at said selected location, and disconnecting the winch cable from the anti-erosion plate means;
  (f) moving the float means while buoyantly supported in the basin from the selected location to a location adjacent a boundary of the basin;
  (g) removing the winch means from the float means and mounting the motor-pump means on the float means with the motor above the float means and the propeller shaft extending down through the central opening in the float means to provide a floatable pump apparatus;
  (h) moving the floatable pump apparatus while buoyantly supported in the basin from a location adjacent the boundary of the basin to said preselected location in the basin; and
  (i) anchoring the floatable pump apparatus at said preselected location in the basin.

Marking buoys can be attched to the anti-erosion plate means and deployed to mark the location of the anti-erosion plate means in the basin, to facilitate subsequent positioning of the floatable pump apparatus over the anti-erosion plate means.

The winch cable is preferably attached to the anti-erosion plate means through a lift harness having a plurality of harness lines attached to the anti-erosion plate at a plurality of locations. The anti-erosion plate may be formed in a plurality of plate sections to facilitate handling and transportation, and the plate sections assembled alongside the water treatment basin prior to setting the float means and anti-erosion plate means in the basin. The plate sections preferably constitute sectors of the anti-erosion plate and the lift harness is attached to the anti-erosion plate along the junction line of adjacent sections.

BRIEF DESCRIPTION OF THE DRAWINGS

FIG. 1 is a side elevational view of a floatable pump apparatus and an anti-erosion plate, shown installed in a basin;

FIG. 2 is a vertical sectional view through a floatable pump apparatus;

FIG. 3 is a diagrammatic view illustrating the step of lifting the float means and anti-erosion plate means preparatory to setting the same in the water treatment basin;

FIG. 4 is a diagrammatic view illustrating the float means buoyantly supporting the anti-erosion plate in the basin;

FIG. 5 is a horizontal sectional view taken on the plane 5—5 of FIG. 3 illustrating the anti-erosion plate construction;

FIG. 6 is a fragmentary horizontal sectional view taken on the plane 6—6 of FIG. 3 illustrating the winch mounted on the float means;

FIG. 7 is a fragmentary view illustrating the detachable connection between the winch line and the lift harness;

FIG. 8 is a fragmentary sectional view taken on the plane 8—8 of FIG. 5 and illustrating details of construction of the anti-erosion plate; and FIG. 9 is a fragmentary sectional view taken on the plane 9—9 of FIG. 5.

The present invention relates to a method of installing a floatable pump, such as a downflow mixer M, and an anti-erosion plate P in a bounded water treatment basin having a bottom B and a boundary or shore S. The floatable pump apparatus in general includes a float 10 having a central opening 10a extending therethrough and a motor-pump means adapted to be mounted on the float. The motor-pump means includes a drive motor 11, a propeller shaft 12 drivingly connected to the drive motor and a propeller 13 on the lower end of the propeller shaft. The motor-pump means is adapted to be mounted on the float means and, as best shown in FIG. 2, the motor is mounted on a mounting plate 19 that is detachably secured to a motor base mounting flange 18 located at the upper side of the float around the central opening 10a. When the motor-pump means is mounted on the float, the motor 11 extends upwardly from the float and the propeller shaft 12 extends downwardly through the central opening 10a with the propeller 13 disposed below the float means. The floatable pump apparatus also includes a pump casing 15 that extends around the propeller 13 and which is attachably mounted as by straps 17 and a casing mounting flange 20 on the bottom of the float around the central opening 10a. The floatable pump apparatus shown herein is preferably a downflow mixer and may for example, be of the type disclosed in U.S. Pat. No. 4,422,771 assigned to the assignee of the present invention, the disclosure of which patent is incorporated herein by reference. As more fully disclosed in that patent, a shaft stabilizer tube 21 is rigidly secured to the plate 19 and extends downwardly around the shaft 12 and anti-deflection bearing means 22 are provided between the stabilizer tube 21 and propeller shaft 12, to limit deflection of the propeller shaft. The motor mounting plate 19 is advantageously arranged to form a seal between the float and the stabilizer tube 21 to inhibit entrance of air therethrough and a shaft seal means 19a is provided between the stabilizer tube and the shaft 12 to inhibit entrance of air therebetween.

The motor-pump means is detachably mounted on the upper side of the float by bolts, studs or the like 25 to enable removal and installation of the motor-pump means on the float. The pump casing 15 is also advantageously detachably mounted as by bolts or studs 26 on the underside of the float to enable removal and assembly of the pump casing means from the float. As shown in FIG. 2, the pump casing means is spaced below the underside of the float to provide a liquid intake below the float, and the lower end of the pump casing 15 is open to allow discharge of water downwardly from the propeller 13. The motor 11 is operative to drive the propeller in a direction to pump liquid from the inlet downwardly through the pump casing and discharge the same in a downwardly directed stream. The float means is sized so that it will buoyantly support the floatable pump apparatus with a substantial safety factor. As is conventional, lift eyes 59 are provided on the top of the motor to facilitate lifting of the motor onto the float and lifting of the motor and float when they are assembled.

The anti-erosion plate P is arranged to cover an area on the bottom of the basin below the mixer, sufficient to at least substantially reduce erosion of the bottom due to the stream discharged from the mixer. The size of the anti-erosion plate can be varied for different installations, dependent on the horsepower size of the mixer and the depth of the basin at the mixer location. However, the anti-erosion plate should generally be sufficiently large to cover an area on the basin bottom of the order of 8 to 12 feet or more in diameter. Such anti-erosion plates, when formed of metal such as 14 gauge sheet steel, are quite heavy, for example of the order of 500 lbs. or more. In order to enable use of the float means to position the anti-erosion plate in the basin, the size and material of the anti-erosion plate means is selected such that the overall weight of the anti-erosion plate means can be buoyantly supported by the float means, when the motor-pump means and pump casing means are removed from the float means. Preferably the overall weight of the anti-erosion plate means is not substantially greater than the combined weight of the motor-pump means and pump casing means.

In order to simplify shipping, the anti-erosion plate means is preferably formed in sections which can be connected together at the job site. In the preferred embodiment illustrated, the anti-erosion plate means P is formed in four sector plate sections designated 31a–31d. The sector plate sections are formed with a depending flange along each side, and the sections are detachably connected as by bolts 32 that extend through adjacent flanges. Reinforcing straps 34 are bolted to the flanges on adjacent sections at the outer side of the erosion plate and extend across the joint between adjacent sections to stiffen and rigidify the erosion plate.

A lift harness 41 is attached to the anti-erosion plate and includes a plurality of harness lift lines 42, preferably at least four in number and which are attached to the anti-erosion plate at a plurality of locations that are generally radially symmetrical with respect to the center of the erosion plate. The lift harness is advantageously preformed and includes lift eyes in the form of lift plates 43 each having an opening 43a therethrough to allow a harness lift line 42 to be passed through the opening and secured upon itself by a cable clamp 44 (see FIG. 8). The plates 43 have a bolt opening therethrough spaced from the opening 43a and the plates are adapted to be positioned between the flanges of adjacent sections of the anti-erosion plate means at a location spaced from the center of the anti-erosion plate means, and the plates then secured to the flanges on adjacent sections by a respective one of the bolts 32. The other ends of the harness lift lines 42 are connected to a common hanger fitting herein shown in the form of a ring 45. The harness lift lines 42 have substantially the same length so that the hanger fitting 45 is disposed substantially above the center of the erosion plate means, when the plate is suspended from the fitting 45.

A winch means W is provided and arranged to be detachably mounted on the upper side of the float means 10 adjacent the central opening 10a. As best shown in Figs. 3, 4 and 6, the winch means W comprises a generally T-shaped mounting base formed by members 48 and 49, an upright standard 51, and a brace 52 extending between the member 49 and the upright standard. A winch 53 is mounted on the upper end of the standard and includes a drum 54 and a drive means such as a hand operated crank 55. The winch means is adapted to be detachably mounted on the motor base mounting flange 18 and, as shown in FIG. 6, the base member 48 has elongated openings 48a adapted to allow a respective one of the motor base mounting bolts to extend therethrough and into the motor base mounting flange to detachably mount the winch means on the float with the winch drum 54 positioned over the central opening 10a in the float. Lift eyes 58 conveniently in the form of eye bolts are also provided and adapted to be mounted in another pair of diametrically opposite motor base mounting holes in the motor base mounting flange 18.

The anti-erosion plate P is preferably shipped in sections to simplify handling and the floatable motor pump apparatus can be either shipped in assembled condition as shown in FIG. 2 or in a disassembled condition in which the motor pump means and the pump casing are disassembled from the float. Because of the size and weight of the floatable pump apparatus, and the size and weight of the anti-erosion plate means it is necessary to provide some form of crane apparatus at the site of the water treatment basin in order to unload the floatable motor pump apparatus and anti-erosion plate from the carrier and to set the floatable pump apparatus and anti-erosion plate in the water. However, it is frequently desired to position the floatable motor pump apparatus in the water treatment basin at a location that is beyond the reach of the available shore based cranes. The present invention provides a method of installing a floatable pump apparatus and an anti-erosion plate means at a selected location in a bounded water treatment basin at a location remote from the shore of the basin.

As previously described, the floatable pump apparatus can be shipped with the motor pump means disassembled from the float and with the pump casing means also dissambled from the float. Alternatively, if the floatable pump apparatus is shipped in an assembled condition, the motorpump means and pump casing means must be removed from the float at the job site before attaching the winch means thereto.

The anti-erosion plate means P is assembled at a location alongside the water treatment basin and is preferably assembled with the flanges extending downwardly. For this purpose, the sections of the anti-erosion plate may conveniently be supported by temporary supports X so as to be spaced above the ground a distance sufficient to allow a worker to work underneath and insert the bolts 32 through the flanges of adjacent sections and through the flanges and tie straps 34. The lift plates 43 of the preformed lift harness 41 are interposed between the flanges on adjacent sections and secured by a respective one of the bolts 32 that connect adjacent sections to each other to thereby attach the lift harness to the anti-erosion plate.

The winch means W is mounted on the upper side of the float means adjacent the central opening 10a and one end 60a of the winch cable is extended down through the central opening in the the float means for attachment to the anti-erosion plate means. For this purpose, a crane cable 65 from a shore based crane (not shown) is attached through lift lines 66 to lift eyes 58 on the upper side of the float means. Preferably the crane is first operated to lift the float means into a position overlying the anti-erosion plate means to facilitate attachment of a hook 61 on the winch line 60a to the fitting 45 in the lift harness 41, and the crane thereafter operated to lift the float means with the anti-erosion plate means suspended from the winch cable, as shown in FIG. 3, and to deposit the float means and anti-erosion plate in the water treatment basin adjacent the boundary of the basin as shown in FIG. 4.

The float is adapted to buoyantly support the anti-erosion plate with the anti-erosion plate spaced above the bottom of the basin and the float and anti-erosion plate can then be moved, for example by pulling on lines such as cables 60 attached to the float and extending to shore, or by towing with a boat to the desired location in the basin. The winch means W is then operated to lower the anti-erosion plate onto the bottom of the basin and the winch cable thereafter detached from the anti-deflection plate means. For this purpose, a hook release line 61a (FIG. 7) is attached to the hook 61 on the winch line 60a and is so arranged as to release the hook from the fitting 45 when the release line is pulled from a location adjacent the float. The position of the anti-erosion plate on the bottom of the basin is preferably marked as by floating marker buoys 71 that are attached by flexible lines 72 to the anti-erosion plate adjacent its corners. One end of the lines 72 for the marker buoys can be attached to the anti-erosion plate while it is on shore and the marker buoys can be stowed on the top of the float during setting of the float and anti-erosion plate in the basin and during the movement of the anti-erosion plate to the selected location in the basin.

When the anti-erosion plate is deposited at the desired location of the bottom of the basin, the buoys are deployed to mark the location of the anti-erosion plate and the float and winch means, while buoyantly supported in the basin, are then moved back to a boundary of the basin. The winch means is removed and the motor-pump means and casing means thereafter assembled onto the float means to form a floatable pump apparatus. Removal of the winch means and assembly of the motor pump means on the float is conveniently effected on the shore of the basin. For this purpose the crane cable 65 is connected through lift lines 66 to the lift eyes 58 on the float means and the crane then operated to lift the float means and winch out of the basin and onto the shore. The lift lines 66 are then disconnected from the lift eyes 58 and from the float and thereafter connected to the lift eyes 59 on the motor to lift the motor-pump unit and position it on the float means for assembly thereon. After assembly, the floatable pump apparatus is lifted and moved by the shore based crane back into the basin at a location alongside the boundary of the basin. The floatable pump apparatus, while buoyantly supported in the basin, is thereafter moved, as by pulling the anchor cables 60 or by towing with a boat, back to a position over the anti-erosion plate as marked by the buoys and the floatable pump apparatus then anchored in a position overlying the anti-erosion plate. This can be achieved either by adjusting the anchor cables 60 to position and retain the floatable pump apparatus at a location over the anti-erosion plate or by attaching the floatable pump apparatus to posts or other anchors fixed to the bottom of the basin.

As will be seen, the present method uses the float 10 for the floatable pump apparatus to also move the anti-erosion plate into a selected location in the basin. The present method supports the anti-erosion plate from a single line located centrally of the float, during movement of the anti-erosion plate to the desired location in the basin and also during lowering of the anti-erosion plate to the bottom of the basin. This minimizes the likelihood of tilting or inverting the float during installation of the anti-erosion plate. Further, since the motor-pump means is removed from the float during installation of the anti-erosion plate, the full buoyant capacity of the float is available for supporting the anti-erosion plate during installation.

The embodiments of the invention in which an exclusive property or privilege is claimed are defined as follows:

1. A method of installing a floatable pump apparatus and an anti-erosion plate means at a selected location in a bounded water treatment basin having a bottom, the floatable pump apparatus including float means having upper and lower sides and a central opening therethrough, and motor-pump means adapted to be mounted on the float means for buoyant support thereby and having a drive motor and a propeller shaft drivingly connected to the drive motor and propeller means on the propeller shaft; the method comprising the steps of (a) mounting a winch means on the upper side of the float means adjacent the central opening in the float means, and extending one end of a winch cable from the winch means downwardly through said central opening;

(b) attaching said one end of the winch cable means to the anti-erosion plate means;

(c) lifting the float means and winch means with the anti-erosion plate means suspended from the winch cable means below the float means and setting the anti-erosion plate means and float means in the basin at a location remote from said selected location;

(d) moving the float means with the anti-erosion plate buoyantly supported thereby to said selected location;

(e) operating the winch means to lower the anti-erosion plate means onto the bottom of the basin at said selected location, and disconnecting the winch cable means from the anti-erosion plate means;

moving the float means while buoyantly supported in the basin from the selected location to a location adjacent a boundary of the basin;

(g) removing the winch means from the float means and mounting the motor-pump means in the float means with the motor above the float means and the propeller shaft extending down through the central opening in the float means to provide a floatable pump apparatus;

(h) moving the floatable pump apparatus while buoyantly supported in the basin from a location adjacent the boundary of the basin to said preselected location in the basin; and (i) anchoring the floatable pump apparatus at said preselected location in the basin.

2. A method in accordance with claim 1 including attaching marking buoys through flexible lines to the anti-erosion plate means, and deploying the marking buoys to mark the location of the anti-erosion plate means on the bottom of the basin before step (h).

3. A method in accordance with claim 1 wherein the floatable motor-pump apparatus also includes a pump casing, including the steps of attaching the pump casing to the float means after step (f) and before step (h).

4. A method in accordance with claim 1 wherein the anti-erosion plate means includes a plurality of plate sections, the method including the step of assembling the plate sections at a location adjacent the water treatment basin prior to setting the float means and anti-erosion plate means in the basin.

5. A method of installing a floatable pump apparatus and an anti-erosion plate means at a selected location in a bounded water treatment basin having a bottom, the floatable pump apparatus including float means having upper and lower sides and a central opening therethrough, and motor-pump means adapted to be mounted on the float means and having a drive motor and a propeller shaft drivingly connected to the drive motor and propeller means on the propeller shaft; the method comprising the steps of (a) mounting a winch means on the upper side of the float means adjacent the central opening in the float means, and extending one end of a winch cable from the winch means downwardly through said central opening;

(b) attaching a lift harness having a plurality of harness lines to the anti-erosion plate means at a plurality of locations, and attaching said one end of the winch cable means to the lift harness;

(c) lifting the float means and winch means with the anti-erosion plate means suspended from the winch cable means below the float means and setting the anti-erosion plate means and float means in the basin at a location remote from said selected location;

(d) moving the float means with the anti-erosion plate buoyantly supported thereby to said selected location;

(e) operating the winch means to lower the anti-erosion plate means onto the bottom of the basin at said selected location, and disconnecting the winch cable means from the lift harness;

(f) moving the float means while buoyantly supported in the basin from the selected location to a location adjacent a boundary of the basin;

(g) removing the winch means from the float means and mounting the motor-pump means on the float means with the motor above the float means and the propeller shaft extending down through the central opening in the float means to provide a floatable pump apparatus;

(h) moving the floatable pump apparatus while buoyantly supported in the basin from a location adjacent the boundary of the basin to said preselected location in the basin; and (i) anchoring the floatable pump apparatus at said preselected location in the basin.

6. A method in accordance with claim 5 wherein the anti-erosion plate means includes a plurality of sector plate sections, the method including the steps of assembling the sector plate sections with the junction line between adjacent sections extending generally radially of the erosion plate means, and attaching the harness lines to the anti-erosion plate means at the junction lines between adjacent sections.

* * * * *

UNITED STATES PATENT AND TRADEMARK OFFICE
CERTIFICATE OF CORRECTION

PATENT NO. : 4,764,053

DATED : August 16, 1988

INVENTOR(S) : Steven A. Schupbach et al

It is certified that error appears in the above-identified patent and that said Letters Patent are hereby corrected as shown below:

Claim 1, column 7, line 35, insert -- (f) -- before the word moving.

Signed and Sealed this

Sixth Day of December, 1988

Attest:

DONALD J. QUIGG

Attesting Officer

Commissioner of Patents and Trademarks